United States Patent [19]

Harding et al.

[11] Patent Number: 4,584,893
[45] Date of Patent: Apr. 29, 1986

[54] LUBRICATION OF RACK AND PINION APPARATUS

[75] Inventors: Peter E. Harding, West Down, nr. Ilfracombe; Richard G. Symes, New Barnstaple, both of England

[73] Assignee: Harcross Engineering (Barnstaple) Ltd., Barnstaple, England

[21] Appl. No.: 474,548

[22] Filed: Mar. 11, 1983

[30] Foreign Application Priority Data

Mar. 17, 1982 [GB] United Kingdom ............ 8207827

[51] Int. Cl.$^4$ ............................................. F16H 1/04
[52] U.S. Cl. ............................... 74/422; 74/89.17; 74/467; 184/99; 184/100; 184/5; 308/3.5; 277/153
[58] Field of Search ............ 308/3.5, 5 R, DIG. 9; 277/152, 153; 74/89.17, 422, 467; 184/99, 109, 5, 100; 428/408

[56] References Cited

U.S. PATENT DOCUMENTS

| | | | |
|---|---|---|---|
| 661,683 | 11/1900 | Ball et al. | 308/3.5 |
| 990,637 | 4/1911 | Dawson | 184/99 X |
| 1,489,580 | 4/1924 | Lucey | 74/89.17 |
| 1,850,070 | 3/1931 | Booth | 74/422 |
| 2,361,211 | 10/1944 | Kalischer | 308/DIG. 9 |
| 2,387,872 | 10/1943 | Bell | 308/DIG. 9 |
| 2,421,543 | 6/1947 | Cook | 308/DIG. 9 |
| 2,589,582 | 3/1952 | Strughold et al. | 184/99 X |
| 2,919,682 | 1/1960 | Sung | 74/422 X |
| 3,012,448 | 12/1961 | Abraham | 74/422 X |
| 3,377,799 | 4/1968 | Geyer | 74/89.17 |
| 3,718,209 | 2/1973 | Moslo | 184/100 X |
| 3,745,850 | 7/1973 | Bayle | 74/422 |
| 3,762,240 | 10/1973 | Adams | 74/422 X |
| 3,777,580 | 12/1973 | Brems | 74/422 X |
| 3,777,722 | 12/1973 | Lenger | 308/5 R |
| 3,841,723 | 10/1974 | Kelso | 308/187.1 |
| 4,043,620 | 8/1977 | Otto | 308/187.2 |
| 4,093,578 | 6/1978 | Vasiliev et al. | 428/408 X |
| 4,157,045 | 6/1979 | Suzuki | 74/467 X |
| 4,280,741 | 7/1981 | Stoll | 277/152 |

FOREIGN PATENT DOCUMENTS

| | | | |
|---|---|---|---|
| 538404 | 1/1956 | Italy | 184/99 |
| 1219471 | 1/1971 | United Kingdom | 74/422 |
| 2001409 | 1/1979 | United Kingdom | 74/89.17 |
| 150329 | 11/1961 | U.S.S.R. | 184/99 |

Primary Examiner—William F. Pate, III
Assistant Examiner—Shirish Desai

[57] ABSTRACT

A rack and pinion apparatus has lubrication for the rack (14) provided by a split bush (20) of graphite or other solid lubricant. The bush is pressed into contact with the surface of the rack by means of a circumferential spring (22), a sealing lip (23) being provided between the spring (22) and the bush (20) to seal the interior of the apparatus against dust and other foreign matter. The graphite lubricates not only the bearing surfaces (15 and 16) for the rack (14) but also the teeth on the rack and the pinion (11).

6 Claims, 1 Drawing Figure

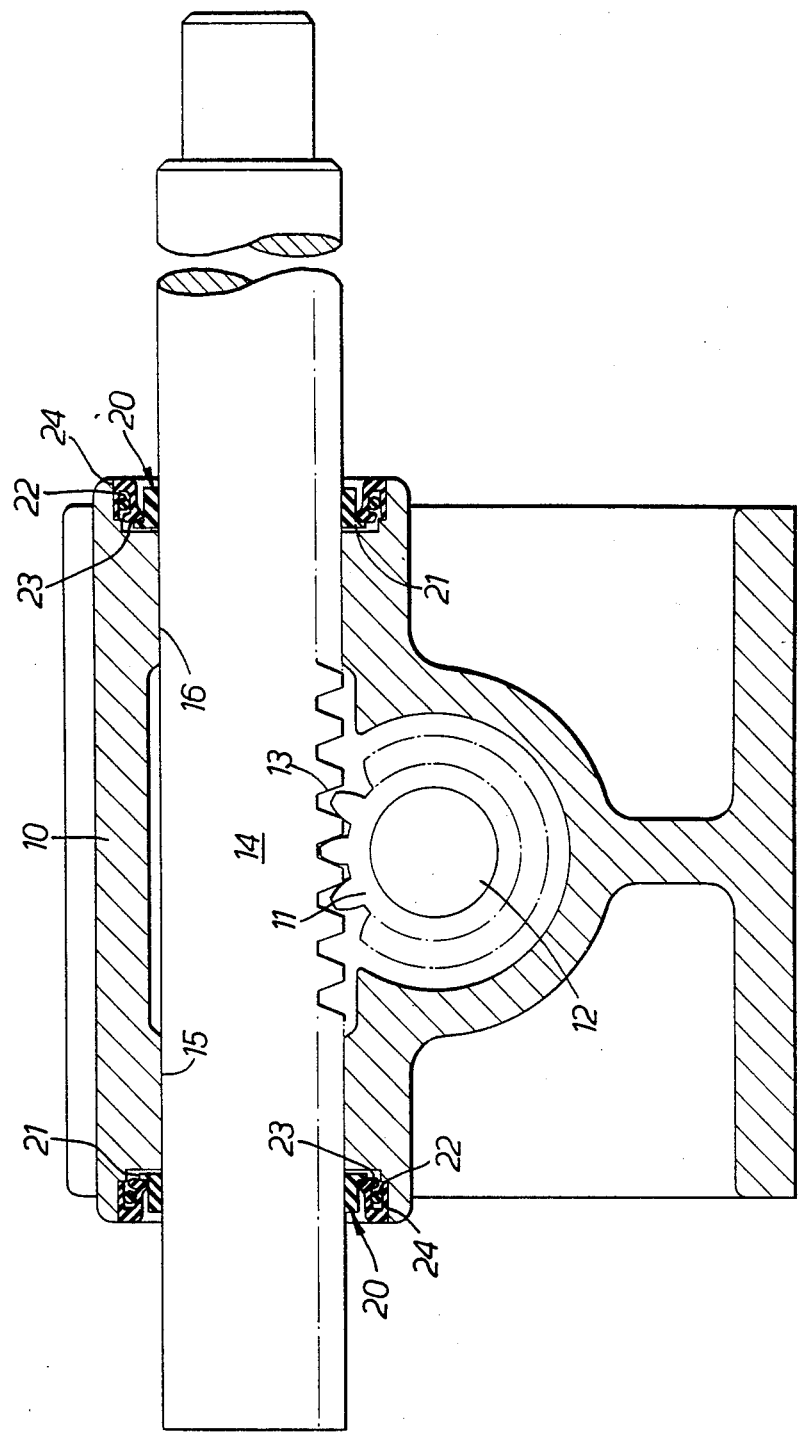

LUBRICATION OF RACK AND PINION APPARATUS

This invention is concerned with the lubrication of rack and pinion apparatus.

Die lifters are used extensively in the car industry and to meet the demands of the production line must operate reliably for many thousands of cycles with minimal maintenance. Die lifters are essentially rack and pinion devices and satisfactory lubrication is a problem that has existed for many years. In particular, it is now the practice in the car industry to steam clean dies and this practice very effectively cleans grease lubricants out of the die lifters requiring them to be re-lubricated.

It is therefore an object of the present invention to provide improved lubrication of rack and pinion apparatus.

The present invention is rack and pinion apparatus comprising a rotatable pinion, a reciprocating rack having teeth in engagement with the teeth of the pinion, bearings for said rack and a supply of lubricant for said bearings, said supply comprising solid lubricant constrained to press against said rack while allowing the rack to move relative to the lubricant.

The lubricant may be provided in the form of a split bush.

Preferably a constraining spring is provided around the periphery of the bush to press the internal bush surface onto the rack.

A sealing lip may be provided between the spring and the periphery of the bush.

An embodiment of the present invention will now be described, by way of example, with reference to the accompanying drawing which is a cross-section of a rack and pinion gearbox.

Referring now to the drawing, a rack and pinion gearbox is provided with a housing 10 in which is mounted a pinion 11 on a shaft 12. The shaft 12 is supported in nylon bushes (not illustrated) filled with a solid lubricant, namely molybdenum disulphide. Teeth 13 on a reciprocable rack 14 engage the teeth of the pinion, and the rack 14 is mounted on bearing surfaces 15 and 16 in the housing 10.

At the outer end of each of the bearing surfaces 15 and 16 is provided a supply of lubricant in the form of a split bush 20 of solid lubricant, in this embodiment graphite. The bush 20 has an external flange 21 located against the housing 10. A circumferential constraining spring 22 bears on a sealing lip 23 to seal it against the periphery of the bush 20 and so retains the halves of the bush 20 in contact with the shaft despite wear. The sealing lip 23 is preferably elastomeric and is bonded to a metal reinforcement ring 24 which is mounted in and seals against the housing 10. In this way the bushing is retained in the housing by the flange between the sealing lip and the housing and foreign matter such as dust is excluded from the interior of the housing.

In use, the lubricant from the bush 20 is deposited on the surface of the rack 14 and conveyed onto the bearing surfaces 15 and 16. Also particles of lubricant are shaved off the bushing by the teeth of the rack and are deposited on the pinion thus providing satisfactory lubrication for the gearbox over a long period. It should also be noted that if the bush 20 wears out it is a quick and simple operation to replace it with a new bush.

It has also been found, somewhat surprisingly, that the bushing 20 and the lubricant coating on the various surfaces survive steam cleaning so that the apparatus requires no lubrication.

Molybdenum disulphide is also a suitable solid lubricant.

We claim:

1. A solid lubricating arrangement for rack and pinion apparatus which converts an input rotary motion into an output linear motion or vice versa, comprising:
    a housing,
    a pinion supported for rotation in said housing,
    a rack supported for reciprocating movement in said housing, said rack having teeth in engagement with teeth of the pinion,
    said housing forming bearing surfaces interiorly of said housing for supporting said rack and resisting substantially all transverse forces to which said rack is subjected from the outside,
    a supply of lubricant for each of said bearing surfaces, each supply comprising a solid lubricant material located next to and separate from a side of each of said bearing surfaces along the direction of said rack toward the exterior of said housing, and
    means fixed to said housing in the vicinity of said bearing surfaces for urging each said supply of lubricant to press against said rack including the teeth thereof while allowing the rack to move relative to the lubricant material, so that the lubricant material is carried by said rack to be deposited on said bearing surfaces when said rack reciprocates in said housing.

2. Apparatus as claimed in claim 1, in which the solid lubricant material is provided in the form of a split bush seated in said housing.

3. Apparatus as claimed in claim 2, in which a constraining spring is provided around the periphery of the bush to press the internal bush surface onto the rack.

4. Apparatus as claimed in claim 2, in which an annular flange is provided on the outer periphery of the bush to confront said housing.

5. Apparatus as claimed in claim 3, in which an annular sealing lip fixed to said housing is provided to extend radially between the spring and the flange on the periphery of the bush for retaining the bush in said housing and preventing matter other than said solid lubricant material from entering the interior of said housing.

6. Apparatus as claimed in claim 1, wherein said solid lubricant material is selected and arranged to be carried by the teeth of said rack for deposition on the teeth of said pinion.

* * * * *